US005992591A

United States Patent [19]

Legorburu Gabilondo

[11] Patent Number: 5,992,591

[45] Date of Patent: Nov. 30, 1999

[54] HYDRAULIC SYSTEM FOR CONTROLLING BRAKES, CLUTCHES AND BRAKE-CLUTCHES

[75] Inventor: Francisco Legorburu Gabilondo, Anzuola, Spain

[73] Assignee: Goizper, S. Coop., Anzuola, Spain

[21] Appl. No.: 08/930,412

[22] PCT Filed: Jan. 30, 1997

[86] PCT No.: PCT/ES97/00018

§ 371 Date: Dec. 29, 1997

§ 102(e) Date: Dec. 29, 1997

[87] PCT Pub. No.: WO97/27995

PCT Pub. Date: Aug. 7, 1997

[30] Foreign Application Priority Data

Feb. 2, 1996 [ES] Spain .................................... 9600251

[51] Int. Cl.[6] ............................ F16D 11/06; F16D 19/00; E03B 11/00

[52] U.S. Cl. .................. 192/18 A; 192/87.17; 137/596.2

[58] Field of Search .............................. 192/18 A, 109 F, 192/87.17, 87.18, 52.4; 137/596.2, 596.18, 596.14

[56] References Cited

U.S. PATENT DOCUMENTS

| | | | |
|---|---|---|---|
| 3,625,250 | 12/1971 | Asperg et al. | 137/596.12 |
| 3,670,767 | 6/1972 | Mahorney . | |
| 4,111,071 | 9/1978 | Pearce et al. | 192/87.13 X |
| 4,261,450 | 4/1981 | Matsushima et al. . | |
| 4,542,767 | 9/1985 | Thorton et al. . | |
| 4,570,677 | 2/1986 | Roxton et al. | 137/596.2 X |
| 4,620,568 | 11/1986 | Sumerford et al. | 137/563 X |
| 5,311,974 | 5/1994 | Rueb | 192/87.13 X |
| 5,535,865 | 7/1996 | Haka et al. | 192/109 F |
| 5,573,092 | 11/1996 | Gabilondo | 192/18 A |

FOREIGN PATENT DOCUMENTS

| | | |
|---|---|---|
| 3230056 | 2/1984 | Germany . |
| 2935702 | 3/1995 | Germany . |
| 4407943 | 8/1995 | Germany . |

*Primary Examiner*—Charles A. Marmor
*Assistant Examiner*—Roger Pang
*Attorney, Agent, or Firm*—Helfgott & Karas, P C.

[57] ABSTRACT

The system is designed for controlling the length of the smooth thrust that takes place during engagement and/or braking of the hydraulic brake-clutches for driving presses or similar machines, and in order that the smooth braking system may be overridden at a given point in time for the machine to be quickly stopped. Two safety valves (16) and (17), an emergency valve (18) and two opening and closing valves (20) and (21) are used for this purpose. A pressurestat (34) located at the end of a labyrinthine duct (35) controls the positioning of the safety valves (16) and (17) and of the emergency valve (18), the labyrinthine duct (35) lying between the pressurestat (34) and the inlet (14) of the relevant hydraulic fluid. The opening and closing valves (20) and (21) control the passage of the hydraulic fluid (oil) between the inlet and the outlet (22) area of the clutch-brake and between this area and the outlet (19).

6 Claims, 3 Drawing Sheets

HYDRAULIC SYSTEM FOR CONTROLLING BRAKES, CLUTCHES AND BRAKE-CLUTCHES

OBJECT OF THE INVENTION

The invention relates to a hydraulic system useful for controlling brakes, clutches and brake-clutches used for the operation of presses and similar machines, in order to provide a cushioned engagement and/or braking for a predetermined length of time and without unduly slowing down said engagement and/or braking operations.

In addition to controlling a cushioned engagement and/or braking, the system acts as a safety means to avoid any risk for the operator that supplies the machine as such, the safety means consisting of valves that have their positioning controlled by a pressurestat provided at the end of a labyrinthine duct arranged between the pressure intake and the actual pressurestat.

BACKGROUND OF THE INVENTION

Electrovalves are used to control the driving of hydraulic pistons, which electrovalves may be driven directly or piloted (servocontrolled), the former being used to control relatively small flows whereas the latter are used for sizeable flows.

Piloted valves are normally used to drive hydraulic brakes, clutches and brake-clutches in presses and similar machines due to the need to obtain high response speeds requiring a fast evacuation of the oil flow displaced by the drive pistons.

Furthermore, in presses and similar machines in which the physical well-being of the operator that supplies the machine is in danger, the brakes and brake-clutches used to drive machines of this kind are also provided with double electrovalves, mounted in such a way that it is necessary for both to be simultaneously driven in order for the machine to be started, and the operation of one such electrovalve must suffice to cause the machine to stop, thereby offering a double stopping safety.

For safety purposes, before starting the next operating procedure with the machine, it is necessary to verify whether both valves worked properly in stopping in order thereby to once again have the double drive safety, which verification is frequently made by inductive detectors that report on the return of the electrovalve rod to its initial position, the electric information supplied by said detectors being processed in order for starting system operation to be locked in the absence of a signal.

Hydraulic brakes, clutches and brake-clutches for driving presses and similar machines are moreover frequently provided with systems for cushioning engagement and/or braking in order to avoid sudden machine operating procedures which may result in the machines breaking down, to which end a system is used, inter alia, consisting of providing the clutch thrust piston with a disk pushed by a number of auxiliary springs that provide less force than that produced by the actual piston, and with limited travel. Similarly, the brake side is provided with a disk pushed by other auxiliary springs that provide less force than the normal braking springs, the foregoing in order for the auxiliary springs to push a disk located on either the clutch side or the brake side, which disk will in either case face a packet of sheets, in one case the clutch sheets and in the other the brake sheets, the disk being in either case pushed, in accordance with the operation of the main piston, against the respective packet of sheets, in order to cause a smooth engagement and/or braking.

There is another way of controlling a smooth cushioning or pushing in said engagement and/or braking operations, as described in this same applicant's Spanish patent of invention 9400215 in which the thrust piston is divided into two parts, one being deemed the main piston and the other one the auxiliary piston, the latter providing less surface to the pressure fluid than the main piston, and therefore at the time of engagement the auxiliary piston will make a first approach to the clutch disk without actually contacting it, followed, upon the brake being released, by a first engagement phase in which the auxiliary piston approaches the main piston and a second phase, after contact between both pistons, in which the assembly works conventionally as a single piston.

Now then, in addition to the foregoing, the smooth braking system needs to be overridden at a given point in time in order that the machine may be stopped in an emergency, such as when the person handling the machine is in a danger zone and when a fast machine reaction is required without regard for its wholeness.

DESCRIPTION OF THE INVENTION

The system subject hereof is designed to successfully regulate a smooth engagement and/or braking, on the one hand, and to override the retarding effect of the actual braking adjustment system in order for the machine to have maximum safety with fast braking.

The hydraulic system as such comprises a pair of pressure opening and closing valves to respectively control the passage of oil at the inlet to the brake-clutch and control the outlet circuit from the brake-clutch to the reservoir. It moreover comprises a servocontrolled emergency valve that shall stay open until and unless the machine goes beyond a particular position or danger zone, further including two servocontrolled or piloted safety valves that are hydraulically connected, as the emergency valve, and linked to a control device that controls the positioning of such valves at all times, relying on a pressurestat that lies at the end of an auxiliary labyrinthine duct connecting the pressure intake or inlet and the actual pressurestat.

The inlet oil opening and closing valve is provided with a spring for controlling opening and a piston for controlling closing, the latter piston being connected to the inlet of oil into the brake-clutch, the force of the opening control spring, in hydraulic terms, being greater than the force of the main normal braking reactive spring, and less than the sum of the force of this main normal braking spring and that of the auxiliary springs that push the relevant disk against the packet of sheets of the clutch, the foregoing in order for the relevant opening and closing valve to stay open while only the main normal braking spring is in operation, and be closed when the reactive force is equal to the sum of such main normal braking spring and that of the auxiliary springs.

The opening and closing valve for the oil leaving from the brake-clutch to the reservoir has a closing spring that has a force, in hydraulic terms, that is less than that of the main normal braking springs and greater than the difference between their force and that of the auxiliary springs that push the relevant disk against the packet of sheets of the brake.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following.

PREFERRED EMBODIMENT OF THE INVENTION

Figure 1:
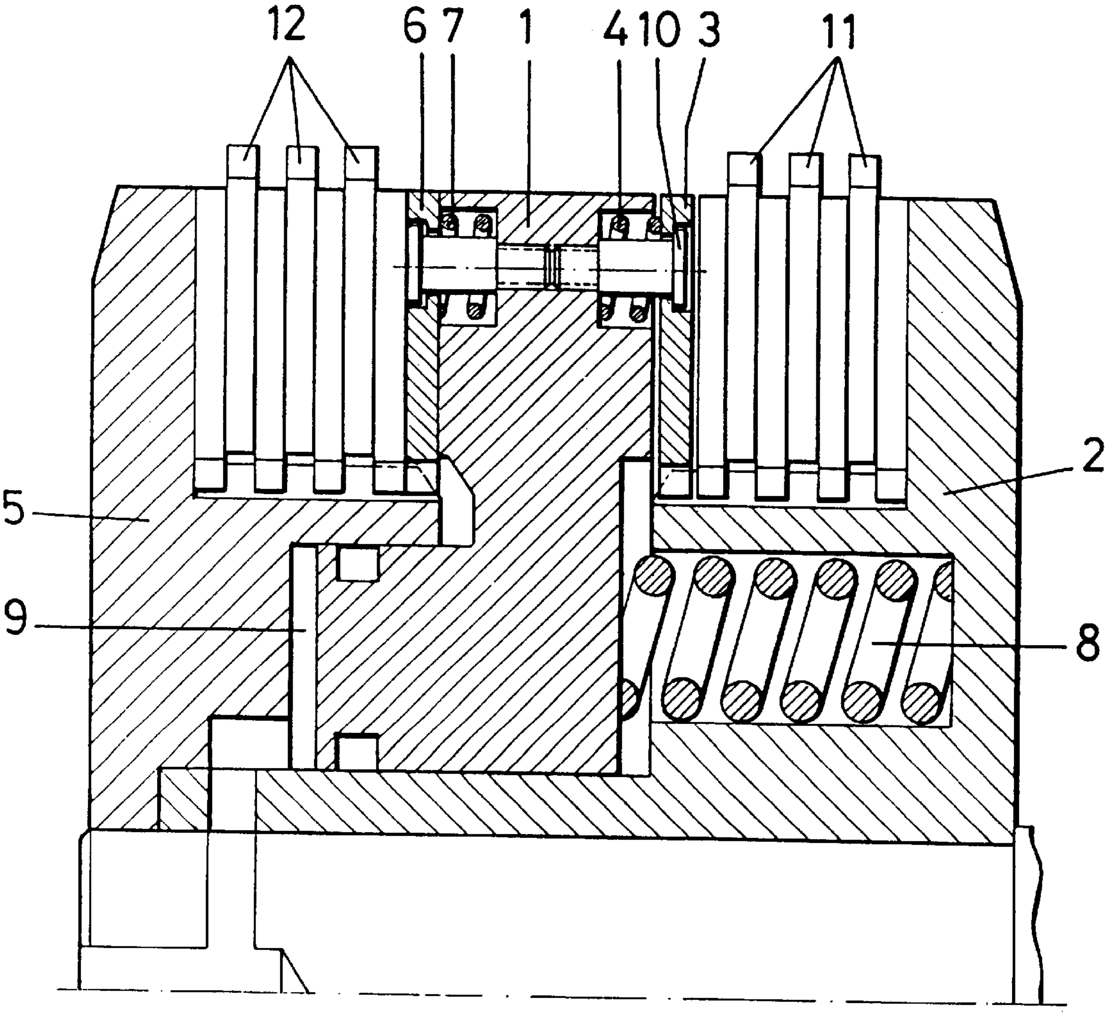
FIG. 1—Is a sectional view of a brake-clutch assembly with the relevant means used conventionally to be able to regulate both a smooth engagement and a smooth braking, which figure will moreover allow the working of the hydraulic system subject of the invention to be understood.

With reference to FIG. 1, a conventional brake-clutch for driving presses and similar machines is shown which comprises the relevant main piston (1) pushing the clutch (2), the clutch side having a disk (3) pushed by a number of springs (4) that provide less force than that produced by the actual piston (1), and with limited travel. Similarly, the brake (5) side has a disk (6) pushed by a number of springs (7) that have less force than the main braking spring (8), which springs push the main piston (1).

Furthermore, with reference to said FIG. 1, a cylinder (9) will produce an engagement force in addition to the force of the normal braking spring (8). The springs (4), having a reduced force, push the disk (3) up to an abutment (10), causing a smooth engagement as of the main piston (1) pushing the disk (3) against the packet of sheets (11) until the main piston (1) touches the disk (3), whereupon engagement will take place with the full force provided by the cylinder (9).

The process of pushing the packet of sheets (12) of the brake (5) takes place similarly, with the smooth force of the springs (7) until the main piston (1) touches the disk (6), whereupon braking takes place with the full force provided by the main braking spring (8).

Figure 2:
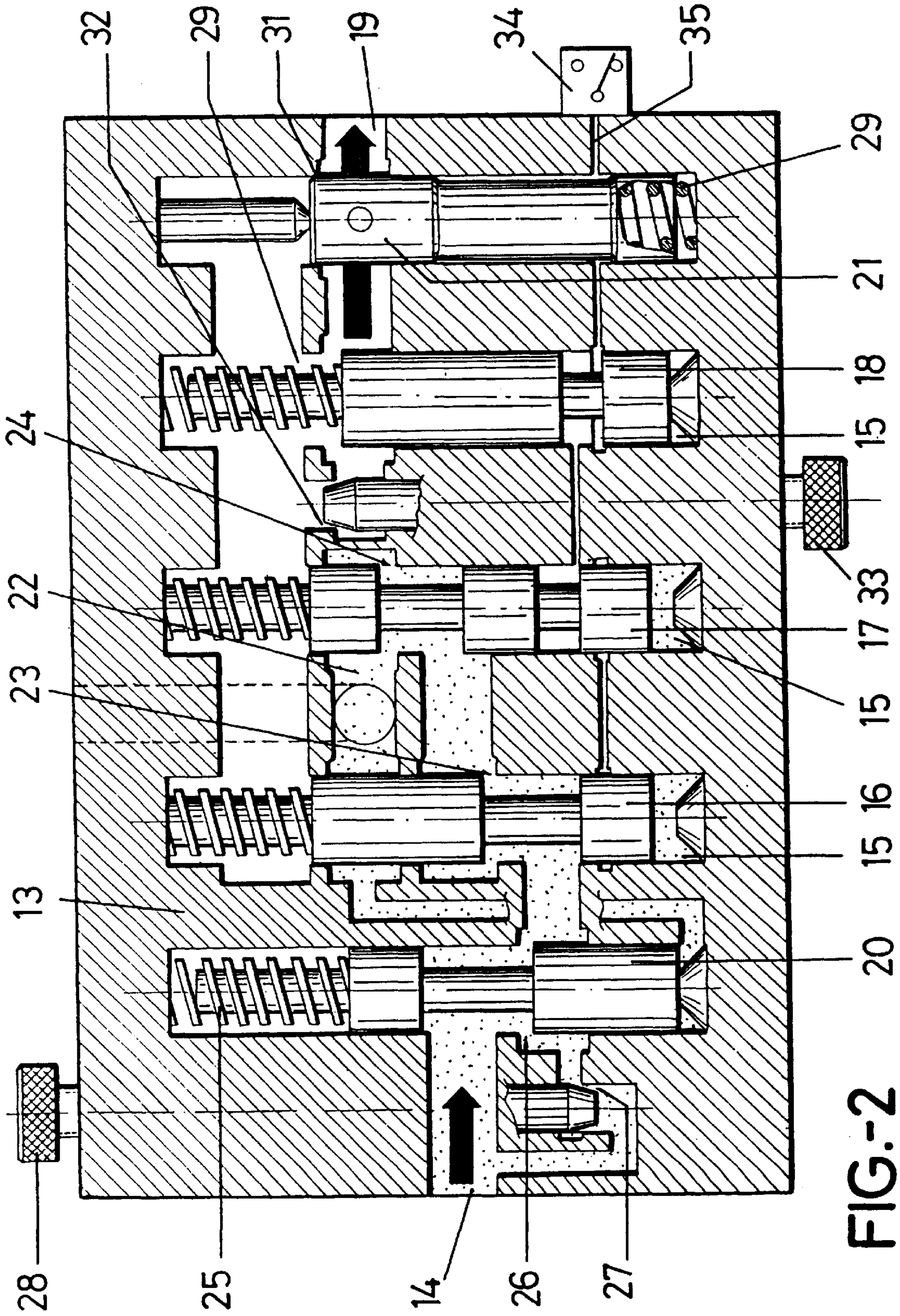
FIG. 2—Is a sectional view of the valve assembly constituting the hydraulic system of the invention, showing the different constituent parts, with the exception of the pilot electrovalves that lie on a plane above the plate shown in section in said figure, that further shows the safety valves closing the way through to the outlet.
Figure 3:
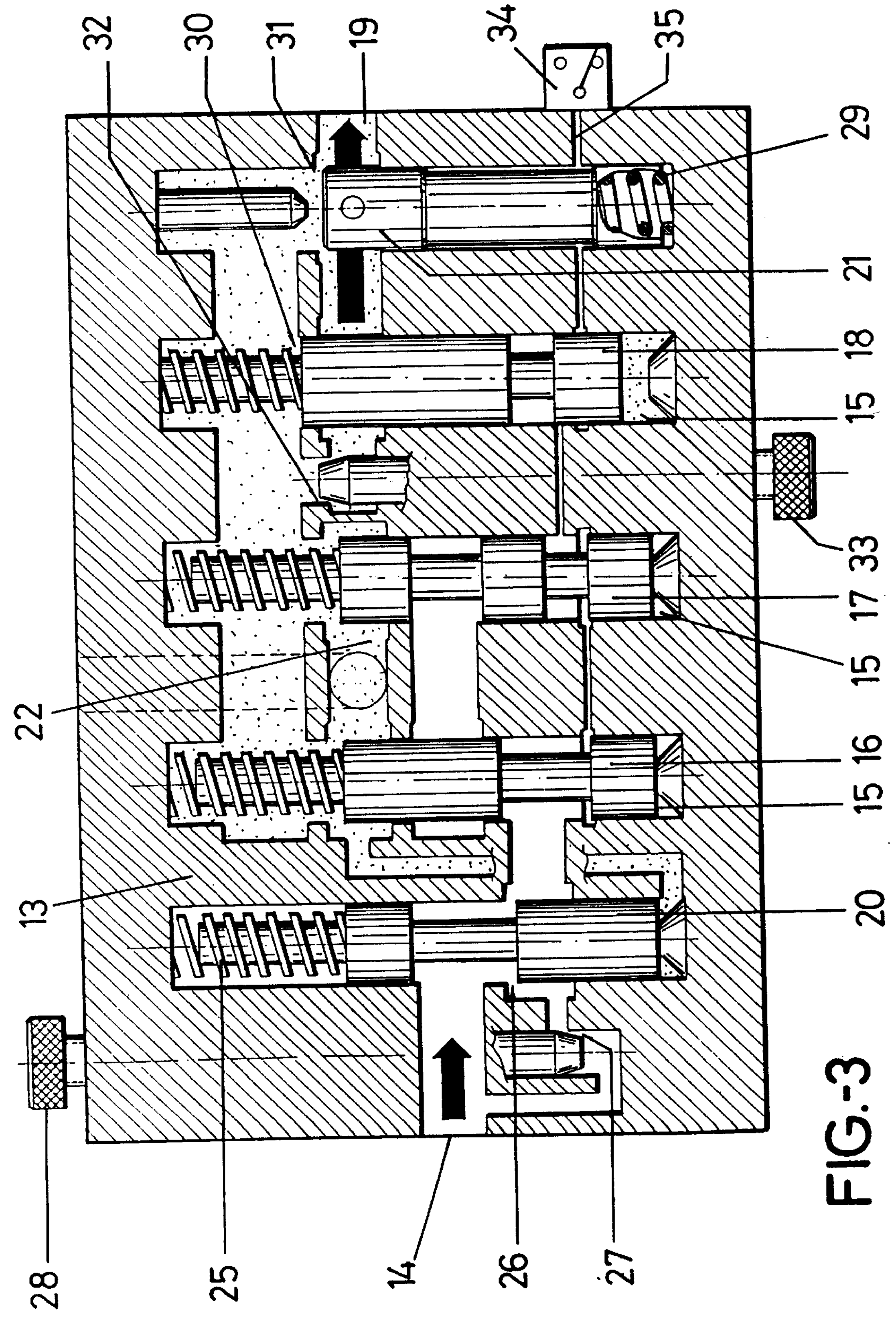
FIG. 3—Is the same section of the preceding figure, with the safety valves in a position that allows the fluid through towards the outlet.

Now then, starting from the brake-clutch system used for driving presses and similar machines, the hydraulic regulating and driving system in accordance with the invention, as shown in FIGS. 2 and 3, includes a plate (13) on which the constituent parts of the actual hydraulic system are all mounted, save for the relevant pilot electrovalves located on a plane above such plate (13) and to be hydraulically connected in order to receive pressurised oil from the inlet (14), in order that upon an electric connection system being given, the inlet communicates with the bottom (15) of the valves (16), (17) and (18), respectively. In turn, upon another electric disconnection signal being given, the respective bottoms (15) of said valves will communicate with the outlet (19), which outlet will correspond with the outlet from the relevant fluid reservoir.

Now then, FIG. 2 shows the safety valves (16) and (17) and the emergency valve (18) and another pair of opening and closing valves (20) and (21), the valves (16) and (17) being shown in the engaged position, because the pressurised oil from the relevant pilot electrovalves will be required at the respective bottoms (15). In this position of the valves (16) and (17), the inlet (14) leads into the outlet area (22) to the brake-clutch.

As shown in this FIG. 2, if either of valves (16) or (17) should not have been driven, the passage (23) or (24) would not have stayed open, and the inlet (14) would not have been connected with the outlet area (22), and no engagement would therefore have taken place, thereby for the first safety condition to be met.

Once the engagement circuit has been connected, it is convenient for the main piston (1) of FIG. 1 to move quickly until it touches the packet of sheets (11) on the clutch side (2) in order for a quick reaction to be obtained. This is achieved because the spring (25) controlling the opening and closing valve (20) has a force equal, in hydraulic terms, to the force comprised between that produced by the main normal braking spring (8) and the sum of the force of the latter and that of the springs (4). Thus, while the piston (1) is travelling until it touches the packet of sheets (11) on the clutch side (2), the reactive force of the system is equivalent to that of the main normal braking spring (8), that is unable to overcome the spring (25) action, a large flow of oil passing through a wide passage (26) shown in FIG. 2, causing the brake-clutch piston (1) to travel quickly.

Once the disk (3) touches the packet of sheets (11), the reactive force will be that of springs (4) and (8) and the system pressure will therefore rise, causing the valve (20) to move to close the passage (26), forcing a low oil flow to pass through the narrow passage (27), said flow being controlled by a regulator (28), thereby for the length of the smooth engagement to be controlled, which is none other than the time taken by the piston (1) of FIG. 1 to move until it touches the disk (3), therefore for the smooth engagement regulation feature to be fulfilled.

Upon the operation of the piloted electrovalves, not shown as aforesaid, the safety valves (16) and (17) will have already shifted to the position shown in FIG. 3, closing the passage of oil between the inlet (14) and the outlet area (22), the passage from such area (22) towards the outlet to the reservoir (19) being in turn opened. It is self-evident that it would have sufficed that only one of valves (16) and (17) be operated, for this would ensure the above-described closing and opening, thereby for another safety condition to be met.

As for the performance of the oil towards the outlet to the reservoir (19), as shown in FIG. 3, the emergency valve (18) is closed, which will prevent the oil from flowing through the passage (30). In this situation, the normal braking spring (8) of FIG. 1 will provide a given pressure in the outlet circuit, whereas a duly tared spring (29) will control the valve (21), the force of this spring (29) being less than that of the normal braking spring (8) and greater than the difference between the force of this spring (8) and that of the spring (7).

Now, therefore, while the disk (6) does not touch the packet of sheets (12) on the brake side (5), the oil pressure will overcome the force of the spring (29) and open the valve (21), leaving a wide passage (31) through which a large flow of oil will exit towards the outlet (19), causing the piston (1) to quickly approach the packet of sheets (12) of the brake (5). Once the disk (6) touches this packet of sheets (12), the springs (7) take away force from the springs (8) and the system hydraulic pressure drops, causing the valve (21) in the passage (31) to be closed, forcing a low oil flow to pass through the narrow passage (32) controlled by a braking regulator (33), thereby for the length of the smooth braking to be fixed at will, which is none other than the time taken by the piston (1) to approach the disk (6), thereby to fulfil the smooth braking regulation feature.

If the valve (18) is opened just as the valves (16) and (17), a wide passage (30) will be determined for oil towards the outlet (19), resulting in the main piston (1) travelling quickly towards the brake side (5) and also in said piston (1), approaching the disk (6) very quickly and braking in less time, thereby to achieve an emergency braking.

If the valve (18) is opened, the oil entering through the inlet (14) will find the way clear up to the end of the labyrinthine duct (35), which will start the pressurestat (34) provided at such outlet or end of said duct (35), which signal will be processed to allow a new operating procedure to begin, for this will indicate that the valves (16), (17) and (18) are in the right position.

Otherwise, i.e. if any of such valves were to be in the position shown for the valve (18) of FIG. 3, the passage of pressurised oil from the inlet (14) to the outlet of the duct (35) would be broken, and the pressurestat (34) would not be started, wherefore no new operating procedure could be begun, thereby for the other safety condition to be met.

If the brake-clutch is of the kind in which the lower thrust is performed by a hydraulic piston of smaller section than the main piston, operation and construction would be similar, logically adjusting the force of the springs of the different valves described.

We feel that the description need not be extended any longer for an expert in the art to have grasped the full scope of the invention and the advantages it offers.

The materials, shape, size and arrangement of the elements may be altered provided that this entails no modification of the essential features of the invention.

The terms used to describe the invention herein should be taken to have a broad rather than a restrictive meaning.

I claim:

1. A hydraulic system for controlling brakes, clutches and brake-clutches, which includes means for cushioning engagement and/or braking to avoid sudden operating procedures in the machine in which the brake, clutch or brake-clutch is applicable, wherein the inclusion of a pair of safety valves (16) and (17), an emergency valve (18) and a pair of opening and closing valves (20) and (21), being particular in that the positioning of the safety valves (16) and (17) for the braking position is controlled by means of a pressurestat (34) located at the end of a labyrinthine duct (35) leading from a pressure intake or inlet (14) up to the pressurestat (34), and therefore when the labyrinthine duct (35) is open it provides the status of each of said valves in the braking position.

2. A hydraulic system for controlling brakes, clutches and brake-clutches, as in claim 1, wherein the emergency valve (18), when in the open position, leaves the way clear for oil of the brake-clutch towards a relevant outlet (22), said valve (18) being similarly controlled by the labyrinthine duct (35) to ensure its open position before the operating procedure begins.

3. A hydraulic system for controlling brakes, clutches and brake-clutches, as in claim 1, wherein the opening and closing valve (20) controls the passage of oil from the inlet (14) towards an outlet (22) area of the brake-clutch, said opening and closing valve (20) having a spring (25) and a closing control piston communicating with the outlet of oil towards the outlet (22) area of the brake-clutch, the force of the spring (25) being such that the valve (20) stays open while the pressure does not exceed the force of a main normal braking spring (8) that pushes a main drive piston, and which valve (20) causes closing when the reactive force is greater that that of the main normal braking spring aforesaid.

4. A hydraulic system for controlling brakes, clutches and brake-clutches, according to claim 1, wherein a passage (27) of less section that may be regulated from the outside by a regulator (28) has been provided in a circuit communicating the oil from the inlet (14) towards an outlet (22) area of the brake-clutch, and parallel to the opening and closing valve (20).

5. A hydraulic system for controlling brakes, clutches and brake-clutches, according to claim 1, wherein an outlet circuit from the brake-clutch, comprised between an outlet (22) area and the outlet to a reservoir (19), is provided with the valve (21) controlled by a spring (29) the equivalent hydraulic force of which is less than that of a main normal braking spring (8) of a main piston, and greater than the difference between that of said spring and that of a relevant smooth braking auxiliary springs (7).

6. A hydraulic system for controlling brakes, clutches and brake-clutches, according to claim 1, wherein a passage (32) of less section controlled from the outside by a regulator (33) has been provided in a circuit communicating the oil from an outlet (22) area of the brake-clutch and the outlet to a reservoir (19), and parallel to the valve (21).

* * * * *